United States Patent [19]
Konuma

[11] Patent Number: 5,258,865
[45] Date of Patent: Nov. 2, 1993

[54] FERROELECTRIC LIQUID CRYSTAL DEVICE

[75] Inventor: Toshimitsu Konuma, Kanagawa, Japan

[73] Assignee: Semiconductor Energy Laboratory Co., Ltd., Kanagawa, Japan

[21] Appl. No.: 769,724

[22] Filed: Oct. 2, 1991

[30] Foreign Application Priority Data

Oct. 3, 1990 [JP] Japan .................. 2-266107

[51] Int. Cl.⁵ .................................. G02F 1/133
[52] U.S. Cl. ........................ 359/78; 359/75; 359/100
[58] Field of Search ............... 359/75, 78, 100, 103, 359/76, 77

[56] References Cited

U.S. PATENT DOCUMENTS 4,662,721 5/1987 Harada et al. .................. 359/76
5,046,830 9/1991 Nakanowatari .................. 359/100

Primary Examiner—William L. Sikes
Assistant Examiner—Huy K. Mai
Attorney, Agent, or Firm—Sixbey, Friedman, Leedom & Ferguson

[57] ABSTRACT

A ferroelectric liquid crystal electro-optical device is described. The device comprises a ferroelectric liquid crystal layer between a pair of glass substrates. Only one of the substrates is provided with an orientation control film. The liquid crystal layer then comprises a layered region located adjacent to and influenced by the orientation control film and a bulk region located apart from the orientation control film.

20 Claims, 5 Drawing Sheets

FERROELECTRIC LIQUID CRYSTAL DEVICE

BACKGROUND OF THE INVENTION

1. Field of the Invention

The present invention relates in general to a ferroelectric liquid crystal device. More particularly, it relates to such a ferroelectric liquid crystal device improved with respect to driving characteristics.

2. Description of the Prior Art

As conventional liquid crystal displays, displays utilizing twisted nematic liquid crystal materials are well known in the field. The displays of this type often exhibit cross-talk between adjacent pixels when driven in matrix configuration.

Displays of the active matrix type provided with thin film transistors for driving respective pixels are also known. Fabrication of the displays of this type, however, may present difficulties owing to low yield of transistors formed on substrate particularly when the size of the substrate is increased. Needs for relatively large equipment investment also make it difficult to proceed with this type.

A new type display device utilizing ferroelectric chiral, smectic C materials has been suggested by N. A. Clark et al, in U.S. Pat. No. 4,367,924. In this device, the smectic liquid crystal material is layered, and the layers 15 are aligned perpendicular to opposed surfaces of the cell as shown in FIG. 1. The liquid crystal molecules lie flat on the surfaces and are restricted at the surface to only two positions (i.e. first and second states) out of the cone of possible orientations that the chiral, smectic C state allows. The surface of the cell has to be closely spaced (about 1 to 3 $\mu$m separation) so that the bulk of the sample follows the molecular orientation at the surface, thereby creating the two surface stabilized states. The influence of the surfaces also helps to suppress the helix of the chiral smectic C material so that the two states are not disrupted. The dipole moment of spontaneous polarization, namely c-director, points normal to the surfaces, up in the first state and down in the second state for example. Hence, the device can be switched between the two states with a pulsed electric field applied via electrode on the surface. The influence of the closely spaced surface causes the switched state to latch so that the state is maintained after the pulse is over, indicating memory characteristics.

The required close spacing between the surfaces presents difficulties in fabrication. This requirement is necessary in order not to form helical structure in the liquid crystal layers. The spacing has to be no wider than 5 times the helical pitch. Such close spacing makes it possible that the surfaces restrict the molecules of the liquid crystal material. This also means that the influence of the surface condition may be significant. For example, appropriate wave forms of driving signals applied to the liquid crystal layer are usually asymmetrical in order to conduct suitable switching between the first and second states. The suitable asymmetrical wave forms tend to substantially vary with age. Accordingly, the stability of switching of the new liquid crystal display is not so high.

BRIEF SUMMARY OF THE INVENTION

The concept of the present invention is entirely different from the prior art concept in which ferroelectric liquid crystal material is disposed between a pair of closely spaced substrates. Namely, a new mode of switching for ferroelectric liquid crystal display will be proposed here. A ferroelectric liquid crystal material is disposed between a first substrate which is given one-axis orientation treatment and a second substrate which is not given any orientation treatment. The first and second substrates are positioned in parallel to each other with a certain spacing therebetween.

The certain spacing is no larger than 100 $\mu$m. The liquid crystal material is aligned between the substrates in two ways. Namely, the liquid crystal material is separated into two regions which are oriented in different manners. One of the regions is a layered region in the vicinity of the orientation control surface of the first substrate. The other of the regions is a bulk region located in the area distant from the control surface. These two regions are switched independently. Furthermore, when an electric field is applied thereto, the bulk easily forms domains as compared with the layered region. The domains in the bulk expands or contracts in accordance with the applied field to carry out switching operation. The switching operation of the layered region seems to be restricted by the one-axis orientation control film, resulting in its relative inactiveness. The liquid crystal material as a whole, however, quickly responds at each domain to pulsed signals and maintains its state until a next signal is input.

It is therefore an object of the present invention to propose a new mode for liquid crystal devices.

It is another object of the present invention to provide a ferroelectric liquid crystal device having a memory characteristics.

It is a further object of the present invention to provide a ferroelectric liquid crystal device capable of operating in a stabilized condition for a long period.

It is a still further object of the present invention to provide a ferroelectric liquid crystal device without need of aligning a pair of substrates closely spaced each other.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, a ferroelectric liquid crystal device comprises a pair of substrates, an electrode arrangement formed on the inside surface of the substrates, an orientation control film provided on the inside surface of one of the substrates and a ferroelectric liquid crystal layer disposed between the substrates. The liquid crystal layer comprises a layered region located adjacent to and influenced by the orientation control film and a bulk region located apart from the orientation control film and free from the influence thereof.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
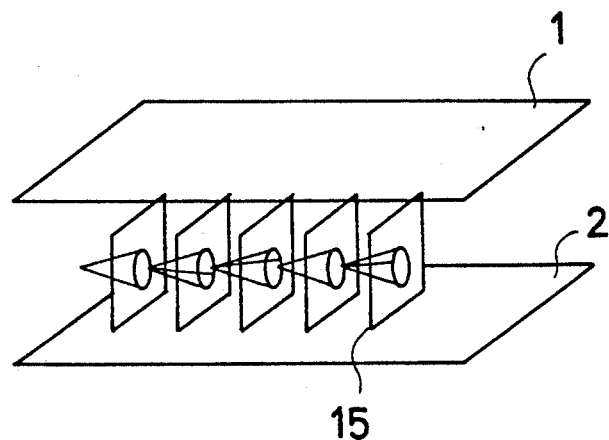
FIG. 1 is a schematic diagram showing a prior art liquid crystal device.
Figure 2:
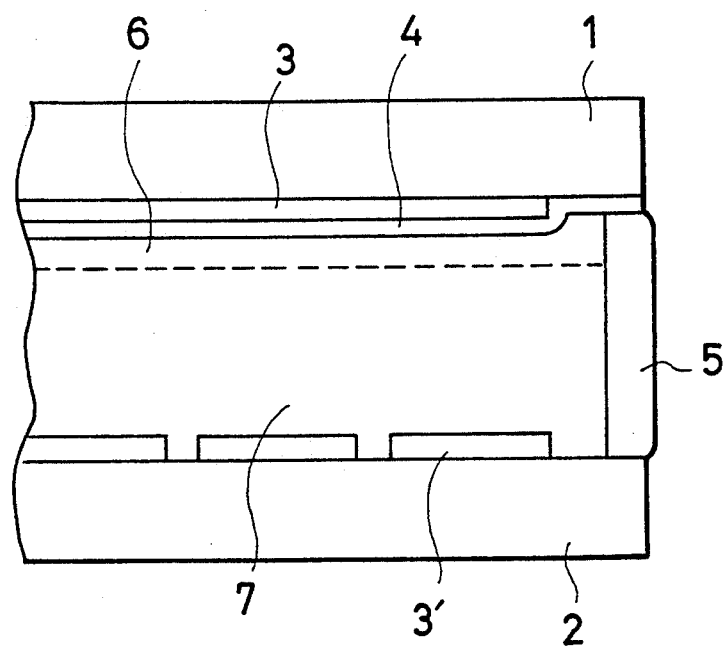
FIG. 2 is a schematic diagram showing a ferroelectric liquid crystal device in accordance with the present invention.

Referring now to FIG. 2, FIGS. 3(A) and 3(B), FIGS. 4(A) and 4(B), FIGS. 5(A) and 5(B), FIGS. 6(A) and 6(B) and FIG. 7 and initially to FIG. 2, a ferroelectric liquid crystal display in accordance with a preferred embodiment of the present invention will be explained.

The liquid crystal display comprises a pair of soda-lime glass substrates 1 and 2. The inside surfaces of the substrates 1 and 2 are formed with a pair of parallel electrode sets 3 and 3' in an orthogonal relationship in order to form pixels arranged in a matrix. One of the substrates 1 is coated with an orientation control film 4 covering the electrode set 3. A ferroelectric liquid crystal is disposed between the substrates 1 and 2 and a sealing 5 is provided to avoid loss of the liquid crystal. The spacing between the substrates 1 and 2 is about 80 μm.

The electrodes sets 3 and 3' are formed by sputtering of ITO (indium tin oxide) to a thickness of 500 Å to 1000 Å followed by patterning. The orientation control film 4 is formed by spin coating of organic resin, e.g. polyimide manufactured by A Corp. to a thickness of 500 Å, giving it thermal treatment for 2 hours and 30 minutes at 280° C. and giving a one-axis orientation control surface by a turning rubbing roller.

The molecules of the ferroelectric liquid crystal comprises at least 7 carbon atoms including an asymmetric carbon atom having a plurality of side chains. The phase transition of the liquid crystal does not involve a nematic phase as shown in below.

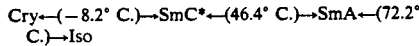

Figure 3A:
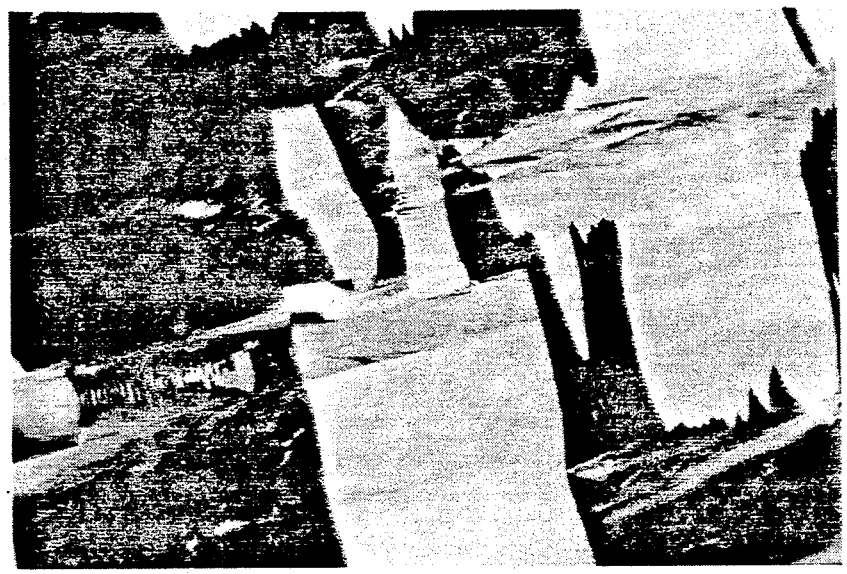
FIG. 3(A) is a copy of a photograph taken by a polarizing microscope with the electrode set 3' of the device shown in FIG. 2 in focus.
Figure 3B:
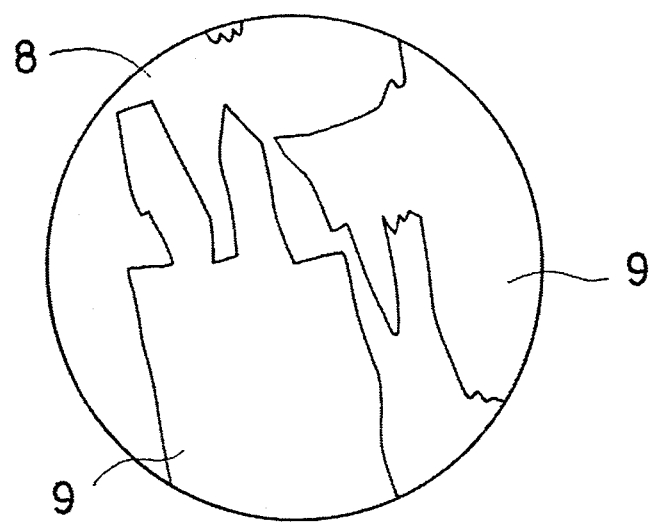
FIG. 3(B) is a schematic illustration of the photograph of FIG. 3(A).

The alignment of the ferroelectric liquid crystal was examined by a polarizing microscope. FIGS. 3(A) and 3(B), FIGS. 4(A) and 4(B) and FIGS. 5(A) and 5(B) show the alignment. FIG. 3(A) is a copy of a photograph taken with the electrode set 3' in focus. FIG. 3(B) is a schematic illustration of the photograph. In the figures, regions 8 and 9 are inverse regions, i.e. white and black images, which apparently seem corresponding to the two "surface-stabilized states" identified by Clark et al. In accordance with the existing theory, the white image 9 should become black and the black image should white by 15° to 20° turning of a stage of the microscope supporting the liquid crystal display.

Figure 4:
FIG. 4(A) is a copy of a photograph taken by a polarizing microscope in the same manner as FIG. 3(A) except that the orientation of the device was changed.
FIG. 4(B) is a schematic illustration of the photograph of FIG. 4(A).
Figure 4:
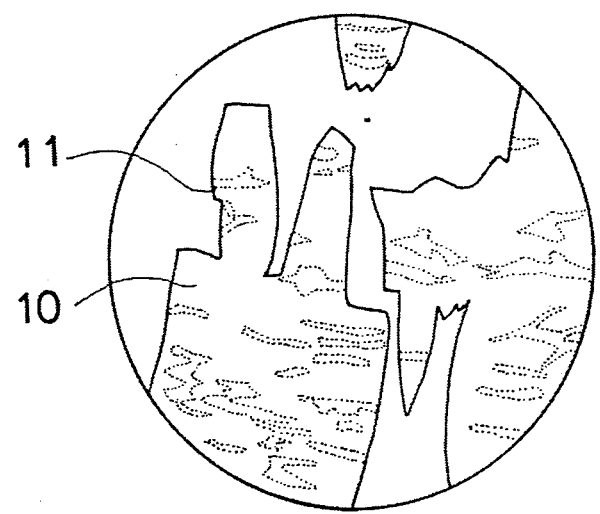

On the contrary to the theory and in accordance with the present invention, the turning of the stage changed the appearance in order that the white region 9 became not completely black but partially grey 10 involving black areas 11 which appeared dimly therethrough as shown in FIGS. 4(A) and 4(B).

Figure 5A:
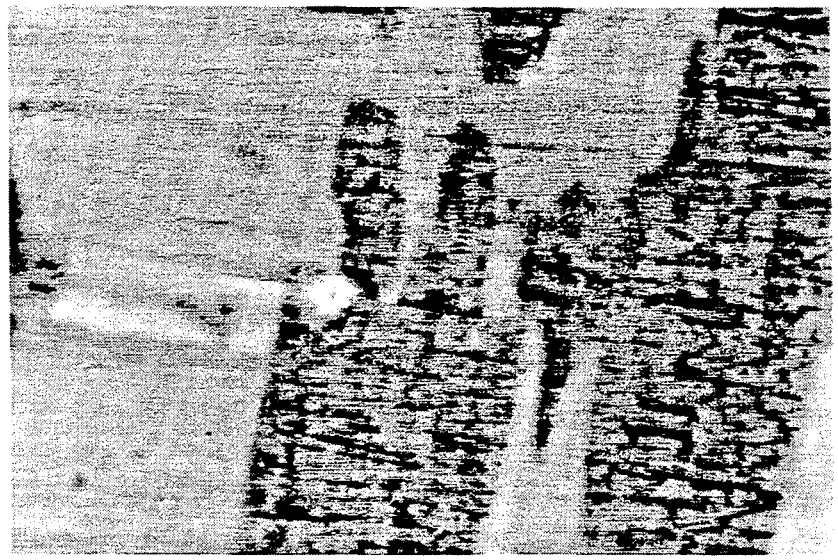
FIG. 5(A) is a copy of a photograph taken with the orientation control film of the device shown in FIG. 2 in focus.
Figure 5B:
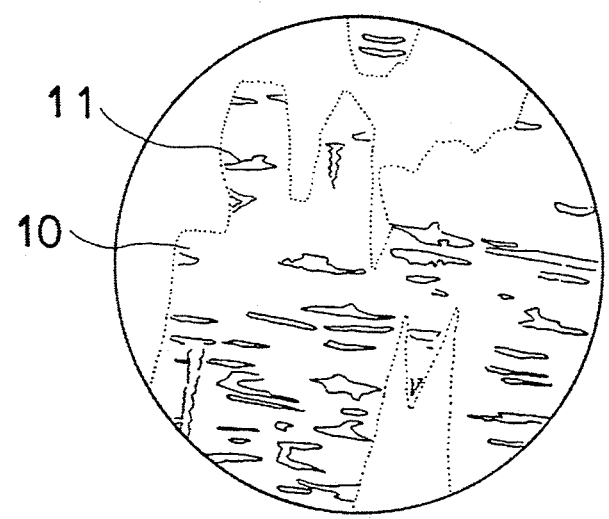
FIG. 5(B) is a schematic illustration of the photograph of FIG. 5(A).

Next, the focus of the microscope was adjusted at the orientation control film 4 without turning the stage. FIG. 5(A) is a copy of a photograph taken with the orientation control film 4 in focus. FIG. 5(B) is a schematic illustration of the photograph. As shown in the figures, the black areas 11 clearly appeared in this condition. This indicates that the alignment of the liquid crystal in the vicinity of the orientation control film 4 was different from that in the bulk regions apart from the orientation control film 4.

When an electric signal was applied to invert the state of the liquid crystal, the black areas 11 observed with the control film 4 in focus little changed while the white and black images 8 and 9 were inverted expanding over the areas 11. This indicates that there were formed a layered thin region 6 and the bulk region 7 which more quickly responded to the signal than the layered region 6. Furthermore, it was confirmed that these regions 6 and 7 exhibited independent responses (independent inversions) to the signal and established a new mode of electro-optical effects.

From these results, it was also confirmed that the layered region 6 functioned to suppress action of the liquid crystal material and the action and, in particular, inversion of the liquid crystal molecules in the layered region 6 are different from or independent of those in the bulk region 7. Change of appearance of the layered region 6 during the inversion of the molecules in the layered region 6 is different from that of the bulk region 7 during the inversion of the molecules in the bulk region 7.

Figure 6A:
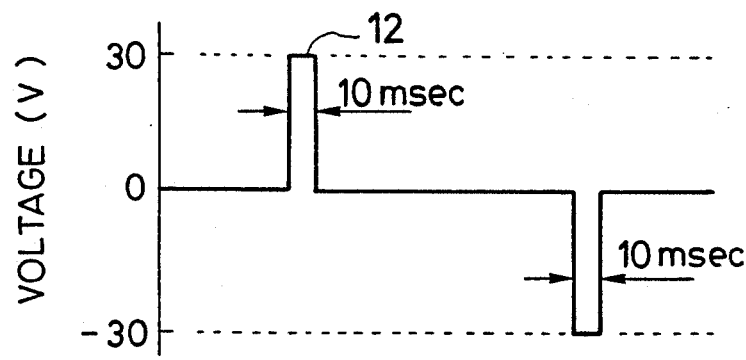
FIGS. 6(A) and 6(B) are graphical diagrams showing the optical characteristics of the device in response to input pulses in accordance with the present invention.
Figure 6B:
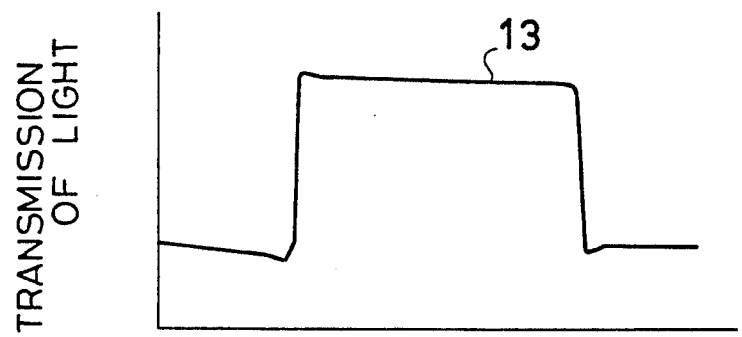

Next, the memory characteristics of the display was examined. A pulse was applied to the liquid crystal layer. The pulse width was 10 msec and the magnitude of the pulse was 30 V. As a result, the strength of light transmitted through the liquid crystal display was quickly increased as illustrated in FIGS. 6(A) and 6(B). The bright condition 13 was maintained until a negative voltage of −30 V was applied for 10 msec, in response to which the strength of the light was quickly decreased as illustrated.

Figure 7:
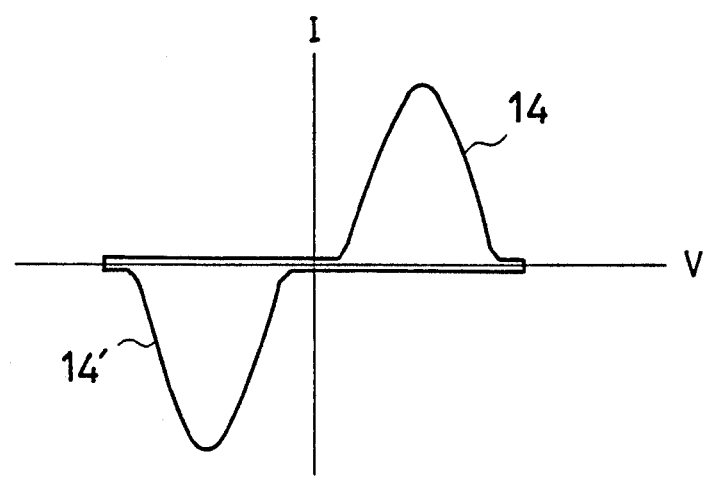
FIG. 7 is a graphic diagram showing the I-V characteristics in accordance with the present invention.

FIG. 7 is a graphic diagram showing the relation of the current to the applied voltage when symmetric sawtooth pulses of 20 V were applied at 5 Hertz. Spontaneous polarization of the liquid crystal appeared when the direction of the voltage changed. Opposed peaks 14 and 14' were located at symmetrical positions with a center of 0 V. From these facts, it was understood that, in accordance with the present invention, the ferroelectric liquid crystal exhibited memory characteristics and the action (inversion) of the liquid crystal was little affected by the inside surface of the substrates since the I-V relation was symmetry.

The same experiment was repeated in the identical condition except that the spacing between the substrates of samples was selected to be 50 μm and 100 μm. As a result, formation of layered and bulk regions and memory characteristics responsive to pulses were confirmed in the same manner.

The same experiment was repeated for reference in the identical condition except that both the substrates of samples were provided with the orientation control films. As a result, there were not observed regions such as the regions 8 and 9 accompanied by white and black areas shown in FIGS. 3(A) and 3(B) and FIGS. 4(A) and 4(B). This might be because the motion of the liquid crystal was undesirably restricted by the opposed orientation control surfaces so that no domain could be formed.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, the present invention can be applied to liquid crystal shutter arrays or other liquid crystal electro-optical devices.

What is claimed is:

1. A ferroelectric liquid crystal device comprising:
   a pair of substrates;
   an electrode arrangement formed on the inside surfaces of said substrates;
   an orientation control film provided on the inside surface of one of said substrates; and
   a ferroelectric liquid crystal layer having helical structure disposed between said substrates, said liquid crystal layer comprising a region located adjacent to and influenced by said orientation control film and a bulk region located apart from said orientation control film.
   wherein liquid crystal molecules in both of said regions are capable of assuming two stable positions in response to an electric field applied thereto.

2. The ferroelectric liquid crystal device as claimed in claim 1 wherein said regions are adapted to independently respond to electric signals applied by means of said electrode arrangement.

3. The ferroelectric liquid crystal device as claimed in claim 2 wherein the response of said bulk region is quicker than that of said region located adjacent to said orientation control film.

4. The ferroelectric liquid crystal device as claimed in claim 1 wherein said ferroelectric liquid crystal layer is in direct contact with said electrode arrangement at the other of said substrates.

5. The ferroelectric liquid crystal device as claimed in claim 1 wherein said orientation control film is formed by coating an organic resin film on said one of said substrates and giving rubbing treatment in one direction.

6. The ferroelectric liquid crystal device as claimed in claim 5 wherein said organic resin film is a polyimide.

7. The ferroelectric liquid crystal device as claimed in claim 6 wherein said polyimide is given thermal treatment.

8. The device of claim 1, wherein said influenced layer and said bulk layer are located in substantially parallel and separate planes.

9. The device of claim 1 wherein a gap between said substrates is in excess of five times the helical pitch of the liquid crystal molecules of said ferroelectric liquid crystal layer.

10. The device of claim 1 wherein the molecules of said liquid crystal layer comprise at least seven carbon atoms including an asymmetric carbon atom having a plurality of side chains.

11. A ferroelectric liquid crystal device comprising:
    a pair of substrates;
    an electrode arrangement provided on the inside surfaces of said substrates;
    an orientation control film provided on the inside surface of one of said substrates; and
    a ferroelectric liquid crystal disposed between said substrates and comprising ferroelectric liquid crystal molecules,
    wherein inversion of the liquid crystal molecules in a region adjacent to one of the inside surfaces of said substrates is different from that in a region apart from said one of the inside surfaces.

12. The ferroelectric liquid crystal device of claim 11 wherein said ferroelectric liquid crystal is in direct contact with said electrode arrangement at the other of said substrates.

13. The ferroelectric liquid crystal device of claim 11 wherein said orientation control film comprises polyimide.

14. The device of claim 11, wherein said adjacent region and said apart region are located in substantially parallel and separate planes.

15. A ferroelectric liquid crystal device comprising:
    a pair of substrates;
    an electrode arrangement formed on opposed inside surfaces of said substrates;
    a ferroelectric liquid crystal layer disposed between said substrates, said liquid crystal layer capable of assuming two stable conditions;
    a uniaxial orientation control film provided in contact with one side of said ferroelectric liquid crystal layer,
    wherein the gap between said substrates is in excess of five times the helical pitch of the liquid crystal molecules of said ferroelectric liquid crystal layer, said liquid crystal layer includes a first region close to said uniaxial orientation control film and a second region distant from said orientation control film, liquid crystal molecules in both of said regions are capable of assuming two stable positions in response to an electric field applied thereto.

16. The device of claim 15 wherein the other side of said liquid crystal layer opposite to the side which contacts said uniaxial orientation control film contacts an electrode of said electrode arrangement.

17. The device of claim 16 wherein said electrode comprises an indium-tin-oxide.

18. The device of claim 15 wherein molecules of said liquid crystal comprise at least seven carbon atoms including an asymmetric carbon atom having a plurality of side chains.

19. The device of claim 15 wherein liquid crystal molecules in said first region moves slower than those in said second region.

20. The device of claim 15 wherein said gap is wider than 50 μm.

* * * * *